United States Patent [19]
Abe

[11] Patent Number: 5,926,351
[45] Date of Patent: Jul. 20, 1999

[54] TAPE CARTRIDGE WITH IRREGULAR SURFACE SECTIONS FOR REDUCING SLIPPAGE BETWEEN CARTRIDGE AND GRIPPING ARMS AND DEBRIS PRODUCTION

[75] Inventor: Masanori Abe, Miyagi, Japan

[73] Assignee: Sony Corporation, Japan

[21] Appl. No.: 08/799,184

[22] Filed: Feb. 12, 1997

[30] Foreign Application Priority Data

Feb. 20, 1996 [JP] Japan .................................... 8-032517

[51] Int. Cl.$^6$ .................................................. G11B 23/02
[52] U.S. Cl. ........................................................ 360/132
[58] Field of Search ............................ 360/132; 242/341, 242/347

[56] References Cited

U.S. PATENT DOCUMENTS

| | | | |
|---|---|---|---|
| 4,714,213 | 12/1987 | Watanabe et al. | 360/132 |
| 5,295,637 | 3/1994 | Takeda et al. | 360/132 |
| 5,432,668 | 7/1995 | Tanaka | 360/132 |
| 5,480,103 | 1/1996 | Gerfast et al. | 242/347 |

FOREIGN PATENT DOCUMENTS

| | | |
|---|---|---|
| 0067490 A1 | 12/1982 | European Pat. Off. ............... 360/132 |
| 450 972 A2 | 10/1991 | European Pat. Off. . |
| 539 222 A2 | 4/1993 | European Pat. Off. . |

*Primary Examiner*—A. J. Heinz
*Attorney, Agent, or Firm*—Ronald P. Kananen; Rader, Fishman & Grauer

[57] ABSTRACT

A tape cartridge that can be extracted from the recording/reproducing apparatus by a changer device in which powder debris caused by abrasion are not produced and flow marks may be prevented from becoming apparent. The tape cartridge has a main body portion, on which outer peripheral wall sections are integrally formed upright, a pair of tape reels rotatably mounted within the inside of the cartridge man body portion and a magnetic tape reeled out from one of the tape reels so as to be taken up on the other tape reel. In the outer peripheral wall section of the cartridge main body portion are formed arm engagement recesses engaged by arms provided on a changer device. On the outer peripheral wall section of the cartridge main body portion are formed arm extraction irregular surface sections having a plurality of crests having sharply pointed distal ends.

8 Claims, 14 Drawing Sheets

US 5,926,351

TAPE CARTRIDGE WITH IRREGULAR SURFACE SECTIONS FOR REDUCING SLIPPAGE BETWEEN CARTRIDGE AND GRIPPING ARMS AND DEBRIS PRODUCTION

BACKGROUND OF THE INVENTION

1. Field of the Invention

This invention relates to a tape cartridge in which a pair of tape reels each having a magnetic tape wound thereon are rotatably accommodated within the inside of a main cartridge body portion.

2. Description of the Related Art

With a tape cartridge, a pair of tape reels, having wound thereon a tape-shaped recording medium, such as a magnetic tape, is rotatably housed within the inside of a main cartridge body portion made up of a pair of cartridge halves combined together. For example, a tape cartridge for a video tape recorder, a tape cartridge for data recording or a tape cartridge for DAT is loaded on a recording/reproducing apparatus, such as a video tape recorder, whereby a magnetic tape is pulled out of the main cartridge body portion by way of tape loading.

FIG. 1 shows a conventional tape cartridge 200 having a main cartridge body portion 201 made up of a lower cartridge half 202 and an upper cartridge half 203. The cartridge halves 202, 203 are opened on the front sides thereof and are shaped as rectangular shallow saucers. Within the inside of the cartridge main body portion 201 are rotatably housed a pair of tape reels having a magnetic tape wound thereon, although not shown. In an opened front side of the cartridge main body portion 201 is formed a loading spacing. When the tape cartridge 200 is loaded into the recording/reproducing apparatus, tape loading means provided on the recording/reproducing apparatus is intruded via this loading spacing. The loading spacing is opened or closed by a lid 204 rotatably supported by the main cartridge body portion 201.

On the lower cartridge half 202 of the main cartridge body portion 201 are mounted a pair of tape guides, not shown, on both sides of the loading spacing. The magnetic tape is reeled out from one of the tape reels and thence led to the front side of the main cartridge body portion 201 so as to be engaged with the tape guides across the loading spacing and so as to be taken up on the opposite side tape reel.

On the rear lateral sides of the tape cartridge 200 are formed a plurality of anti-slip irregular surface sections 205. The user grips the anti-slip irregular surface sections 205 formed on the tape cartridge 200 for inserting or ejecting the tape cartridge 200 into or out of the recording/reproducing apparatus.

Towards the rear of the anti-slip irregular surface sections 205 on the tape cartridge 200 are formed arm-engagement recesses 206. The rear side portions with respect to the arm-engagement recesses 206 are formed as planar surface portions 207. The tape cartridge 200 is inserted into or taken out of the recording/reproducing apparatus by a pair of arms 210 provided on the changer device.

First, when the tape cartridge 200 is ejected out of the recording/reproducing apparatus, not shown, it has its planar lateral surface portions 207 gripped by the arms 210 provided on a changer device, not shown, so as to be pulled out as far as the ejection position, as shown in FIG. 2. The tape cartridge 200 is ejected out of the recording/reproducing apparatus with the arm-engagement recesses 206 retained by the arms 210 of the changer device for inhibiting vertical deflection of the tape cartridge 200.

Since the tape cartridge 200 simply has its planar surface portions 207 gripped by the arms 210 of the changer device when the tape cartridge is taken out as far as the ejection position, as shown in FIG. 2, the tape cartridge tends to slip from the arms 210 of the changer device. The result is that the conventional tape cartridge 200 sometimes cannot be taken out of the apparatus dunce arm-engagement recesses 206 are not reliably engaged by the arms on the changer device.

The tape cartridge 200 is housed within a cartridge container casing 211 made up of a main casing body portion and a lid supported for opening/closure by this main casing body portion. On the inner lateral side of the lid of the cartridge container casing 211 is formed upright a rib 212 for positioning the lateral side of the tape cartridge 200. This rib is formed in register with the planar surface 207 of the tape cartridge 200. Once the tape cartridge 200 is inserted into the main casing body portion and closed by the lid, the tape cartridge has its lateral surface held securely by the rib 212 to prevent the cartridge from fluttering.

However, once the tape cartridge 200 is housed within the cartridge container casing 211, it is subjected to fluttering in the vertical direction by vibrations originating from outside. The planar surface 207 of the tape cartridge 200 has a surface contact with the rib 212 of the cartridge container casing 211 to become worn out as shown in FIG. 3 to produce debris. This debris is intruded into the inside of the tape cartridge 200 to render it impossible to read out information signals recorded on the magnetic tape or to record correct information signals.

Moreover, with the present tape cartridge 200, the synthetic resin material is poured via a gate formed in register with the arm engagement recess 206 for molding. The tape cartridge 200 is molded by cutting the gate off at the surface of the arm engagement recess 206. With the present tape cartridge 200, a gate mark 208 is left at an area where the gate of the arm engagement recess 206 is cut. In addition, a flow mark 209 is formed around the gate mark 208. Thus the conventional data cartridge has a drawback that the gate mark 208 and the flow mark 209 become excessively visible.

SUMMARY OF THE INVENTION

It is therefore an object of the present invention to provide a tape cartridge in which the operation of taking out the tape cartridge out of the recording/reproducing apparatus may be carried out reliably by a changer device and in which powder debris can be prevented from being produced to prevent the flow marks from becoming excessively visible.

A tape cartridge according to the present invention has a cartridge man body portion, on which outer peripheral wall sections are integrally formed upright, a pair of tape reels rotatably mounted within the cartridge main body portion, and a magnetic tape reeled out from one of the tape reels so as to be taken up on the other tape reel. In the outer peripheral wall section of the cartridge main body portion are formed arm engagement recesses engaged by arms provided on a changer device. On the outer peripheral wall section of the cartridge main body portion are formed arm extraction irregular surface sections having a plurality of crests having sharply pointed distal ends.

When the tape cartridge is ejected from the recording/reproducing apparatus, the extraction irregular surface sections are gripped by a pair of arms provided on the changer device. When the tape cartridge has been pulled out to a position of extraction from the recording/reproducing apparatus, the arm engagement recesses are engaged by the arms of the changer device for taking out the tape cartridge out of the recording/reproducing apparatus.

With the above-described tape cartridge of the present invention, in which the arm extraction irregular surface sections comprised of plural crests having sharply pointed ends are formed on the outer peripheral wall section of the main cartridge body portion, these irregular surface sections are gripped by the paired arms on the changer device when the tape cartridge is pulled out of the recording/reproducing apparatus, so that the operation of extracting the tape cartridge out of the recording/reproducing apparatus can be carried out reliably by the changer device.

Also, when the tape cartridge is housed within the cartridge container casing, the arm extraction irregular surface sections are supported by a rib formed upright on the inner surface of the cartridge container casing for preventing fluttering. Since the plural crests of the arm extraction irregular surface sections contacted in a line contact with the rib, it becomes possible to prevent abrasion and consequent generation of powder debris for protecting the magnetic tape.

In addition, since the arm extraction irregular surface sections are formed at the flow marks formed around the gate marks, the flow marks may be prevented from becoming excessively visible by these crests.

DESCRIPTION OF THE PREFERRED EMBODIMENTS

Figure 1:
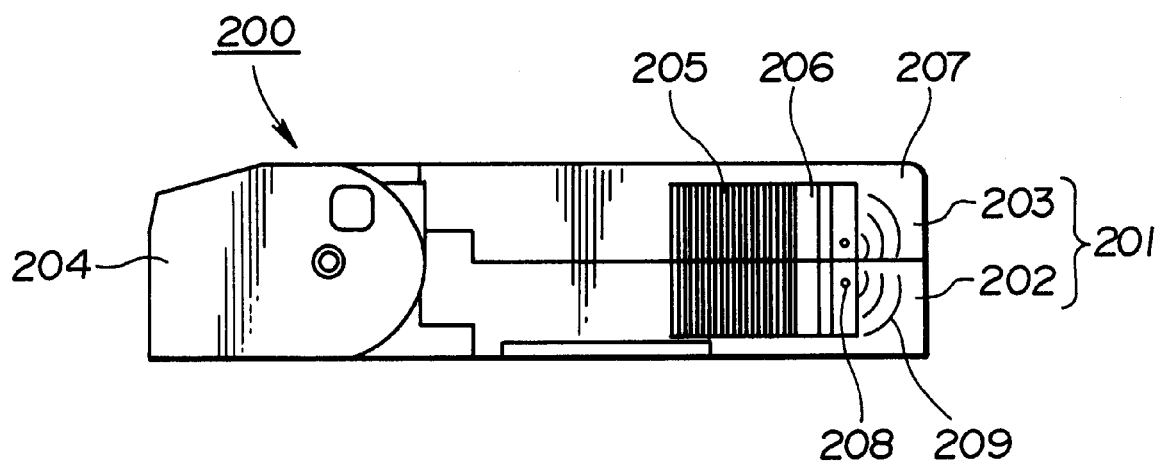
FIG. 1 is a side view showing a conventional tape cartridge.
Figure 2:
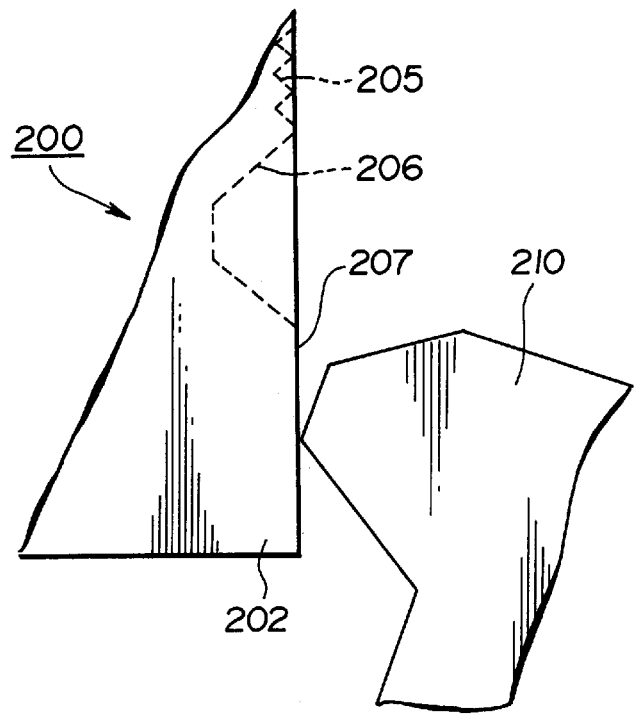
FIG. 2 is an enlarged bottom view showing a conventional tape cartridge as it is pulled by an arm of a changer device.
Figure 3:
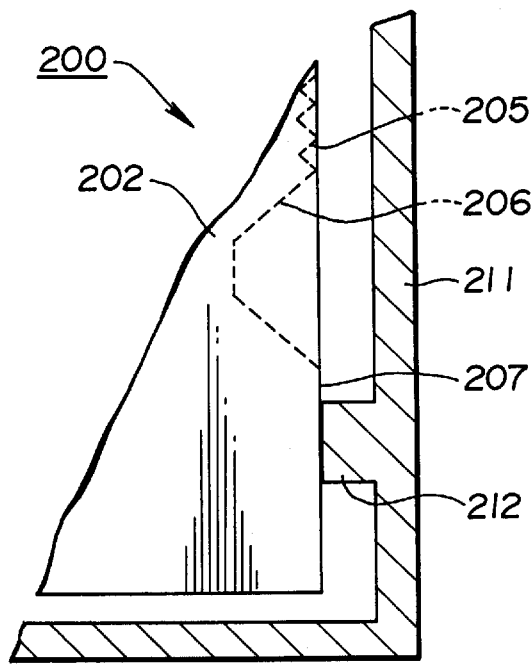
FIG. 3 is an enlarged bottom view showing a conventional tape cartridge housed within a cartridge container casing.

Referring to the drawings, preferred embodiments of the present invention will be explained in detail.

FIGS. 4 to 21 illustrate, as an embodiment of the present invention, a tape cartridge 1 for recording data comprised of a main cartridge body portion 2 in the shape of a thin casing formed by abutting and interconnecting a lower cartridge half 3 and an upper cartridge half 4 formed as rectangular-shaped shallow saucers. The tape cartridge 1 is comprised of the main cartridge body portion 2, a front lid 6 and a back lid 7 for opening/closing a loading spacing 10, combined with the main cartridge body portion 2 and a pair of tape reels 9A, 9B having a magnetic tape 8 thereon and housed within the main cartridge body portion 2.

Figure 4:
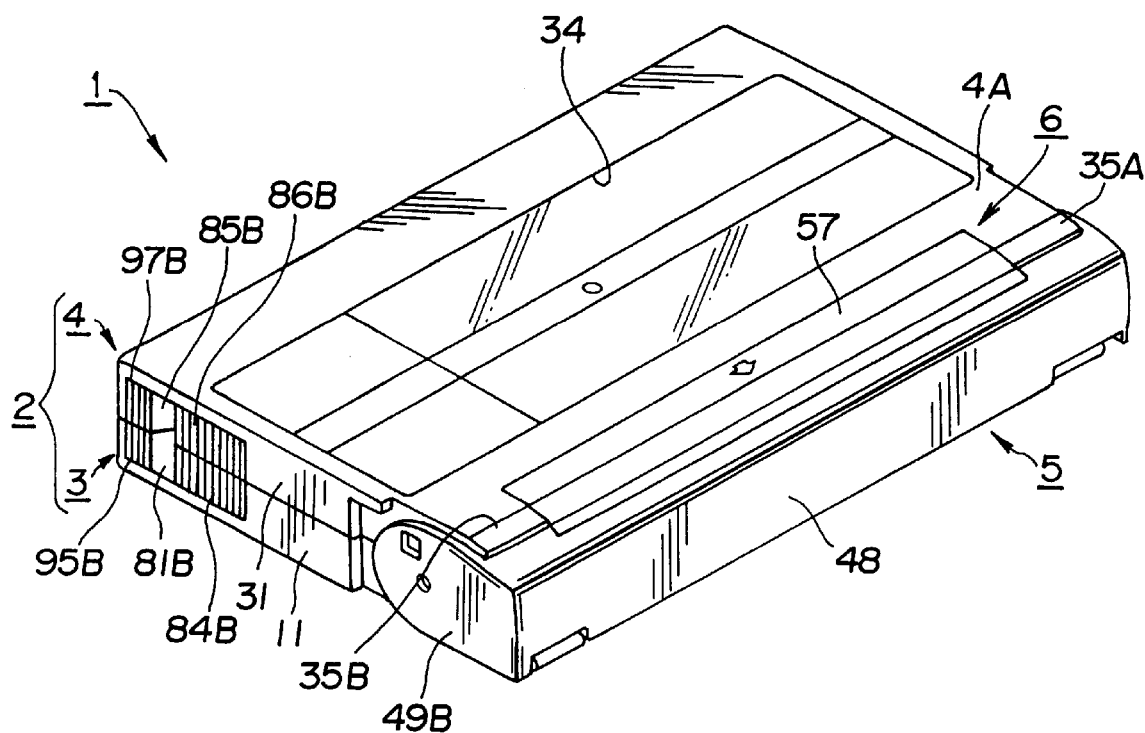
FIG. 4 is a perspective view showing a tape cartridge embodying the present invention.

In the present specification, the side of the tape cartridge 1, shown in FIG. 4, on which is mounted the front lid 6, is termed the front side, and the directions such as "fore-and-aft direction", "left-and-right direction" or the "up-and-down direction" refer to this side as a reference. As for paired components, such as tape reels 9A, 9B, these components are initially designated as tape reels 9(9A, 9B), and are subsequently denoted simply as tape reels 9, unless a specified one of the tape reels is designated.

The lower cartridge half 3 is formed by injection molding, such as insert molding, on a metallic base plate 5, using a synthetic resin material. This base plate 5 is formed of a metallic material, such as aluminum or metal alloys, in a rectangular shape, as shown in FIG. 6.

The base plate 5 performs the role of affording pre-set weight to the tape cartridge 1 and assuring mechanical toughness of the tape cartridge 1 against torsion or warping. The base plate 5 is formed with plural warping correcting recesses 5A in both surface sections thereof in their entirety. This prevents the base plate 5 from being warped in the up-and-down direction.

The base plate 5 is also formed with circular reel apertures 14 (14A, 14B) disposed at the center of a tape reel container section 13. The outer rim of the reel aperture 14 is formed as a planar surface 5B for preventing abrasion by the lower flanges 64 (64A, 64B) of the tape reel 9 as later explained.

Figure 6:
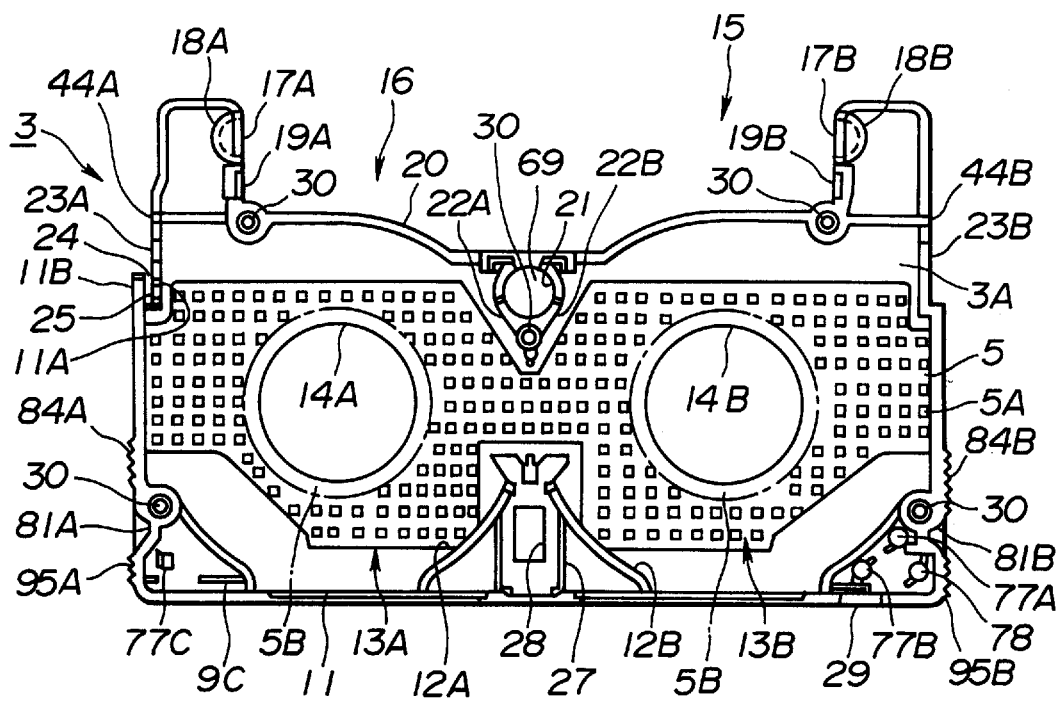
FIG. 6 is a plan view showing a lower cartridge half of the tape cartridge shown in FIG. 4.

The lower cartridge half 3 has an upstanding outer peripheral wall 11 on the outer rim except the front side 15, while the bottom surface 3A is divided at a mid area into two portions, that is a left side portion and a right side portion, as shown in FIG. 6. On the bottom surface 3A are formed arcuately-shaped tape reel container wall sections 12 (12A, 12B), in the left side and right side portions, constituting tape reel containing sections 13 (13A, 13B) having tape reels 9 rotatably housed therein, with the arcuately-shaped tape reel container wall sections being on the same circumference of a circle.

In a center area of an opened front side 15 of the lower cartridge half 3 is formed a substantially rectangular cut-out 16 having a mid area disposed slightly inwardly of the bottom surface 3A. On the bottom surface 3A of the lower cartridge half 3 are formed a pair of upstanding side guide ribs 17 (17A, 17B) making up upstanding two sidewall sections of the cut-out 16. These side guide ribs 17 are of a height slightly larger than the height of the inner spacing of the cartridge main body portion 2 and tape guides 18 (18A, 18B) are formed on the outer lateral sides of the distal ends thereof.

The tape guides 18 have smooth arcuately-shaped outer peripheral surfaces and are protuberantly formed as one with the outer peripheral sides of the distal ends of the side guide ribs 17. These tape guides 18 are disposed slightly inwardly of the front side 15, that is by a distance slightly larger than the thickness of the front lid 6, as later explained.

In the present embodiment of the tape cartridge 1, the tape guides 18 are formed as one with the outer lateral sides of the distal ends of the side guide ribs 17. However, this structure is merely illustrative. For example, the tape guides may be formed by a pair of shaft-like protrusions integrally formed with the bottom surface 3A of the lower cartridge half 3 on both sides of the cut-out 16. The tape guides may also be configured by a pair of supporting shafts formed as one with the bottom surface 3A of the lower cartridge half 3 on both sides of the cut-out 16 and sleeves associated with these supporting shafts.

The facing inner sides of the side guide ribs 17 are formed with lid guide grooves 19 (19A, 19B) of the same shape. These lid guide grooves 19 are formed as cam grooves descending forwardly from the inner distal ends of the side guide ribs 17 as far as the terminal ends of the outer lateral sides thereof in both the up-and-down and fore-and-aft directions. These lid guide grooves 19 are substantially in the shape of a letter S combined from the protuberant arcuately-shaped groove and a recessed arcuately-shaped groove.

On the lower cartridge half 3 is formed an outer peripheral rib 20 as one with the bottom surface 3A for constituting an inner upstanding peripheral wall of the cut-out 16. This outer peripheral rib 20 has a size in height approximately one-half the size in height of both side guide ribs 17 and has its both ends connected as one with the inner lateral edges of the side guide ribs 17. The outer peripheral rib 20 is formed on an inner side of a mid portion thereof with a tape end detection light source entrance portion 21.

This tape end detection light source entrance portion 21 is made up of an inwardly directed U-shaped upstanding wall section protuberantly formed at a mid portion of the outer peripheral rib 20, an arcuately-shaped upstanding wall section facing the U-shaped wall section, and a light source hole bored through the bottom surface 3A of the lower cartridge half 3. An aperture operating as a light radiating aperture of the detection light of a tape end detecting light source 69 as later explained is placed between the U-shaped upstanding wall section and the arcuately-shaped upstanding wall section of the tape end detection light source entrance portion 21. The inner surface of the outer peripheral rib 20 is formed as one with one ends of arcuately-shaped tape reel housing wall sections 22 (22A, 22B). Thus the tape end detection light source entrance portion 21 is located in a substantially triangular spacing surrounded by the outer peripheral rib 20 and the tape reel housing wall sections 22.

The reel housing wall section 22 is formed upright as one with the bottom surface 3A of the lower cartridge half 3 and is located on the same circumference of a circle as that of the tape reel container wall sections 12 described above. The reel housing wall section 22 and the tape reel container wall sections 12 together make up the tape reel housing section 13 of the lower cartridge half 3. The opposite end of the tape reel housing wall section 22 is formed as one with one of fitting tubes 30. The bottom surface 3A of the lower cartridge half 3 is formed appropriately with fitting tubes 30.

The front portions of both lateral surfaces of the lower cartridge half 3 are formed with tape end detection holes 23 (23A, 23B). These tape end detection holes 23 are formed in the outer peripheral wall section 11 on a line of extension of the light path of the tape end detecting light source 69 extending along the inner surface of the outer peripheral rib 20.

The tape end detection light source entrance portion 21 is tubular in shape in its entirety and has a light source cover 70 of a U-shaped cross-section, secured to the upper opened portion. With the tape cartridge 1 loaded on the recording/reproducing apparatus 101, as later explained, the light source cover 70 prevents diffusion of the detection light radiated from the tape end detection light source 69 on the recording/reproducing apparatus 101 and intruded into the tape end detection light source entrance portion 21 as well as intrusion of dust and dirt into the tape cartridge 1.

The lower cartridge half 3 has a lid opening guide groove 24 which is formed by bending part of the outer peripheral wall section 11 on the right side surface section. When the tape cartridge 1 is loaded on the recording/reproducing apparatus 101, a lid driving member on the recording/reproducing apparatus 101 is intruded into the lid opening guide groove 24 for driving a lid lock mechanism operating for holding a lid structure as later explained in the locked state.

The lid lock mechanism is made up of a lid lock lever 71 and is provided on the lower cartridge half 3 along the lid opening guide groove 24. The outer peripheral wall section 11 making up the lid opening guide groove 24 has a lid lock lever mounting portion 25 formed integrally with an upper edge thereof.

The lid lock mechanism is comprised of a lid lock lever 71 and is mounted on the lower cartridge half 3 along the lid opening guide groove 24. That is, the outer peripheral wall section 11, constituting the lid opening guide groove 24 has a lid lock lever mounting portion 25 integrally mounted on the upper edge thereof.

Figure 5:
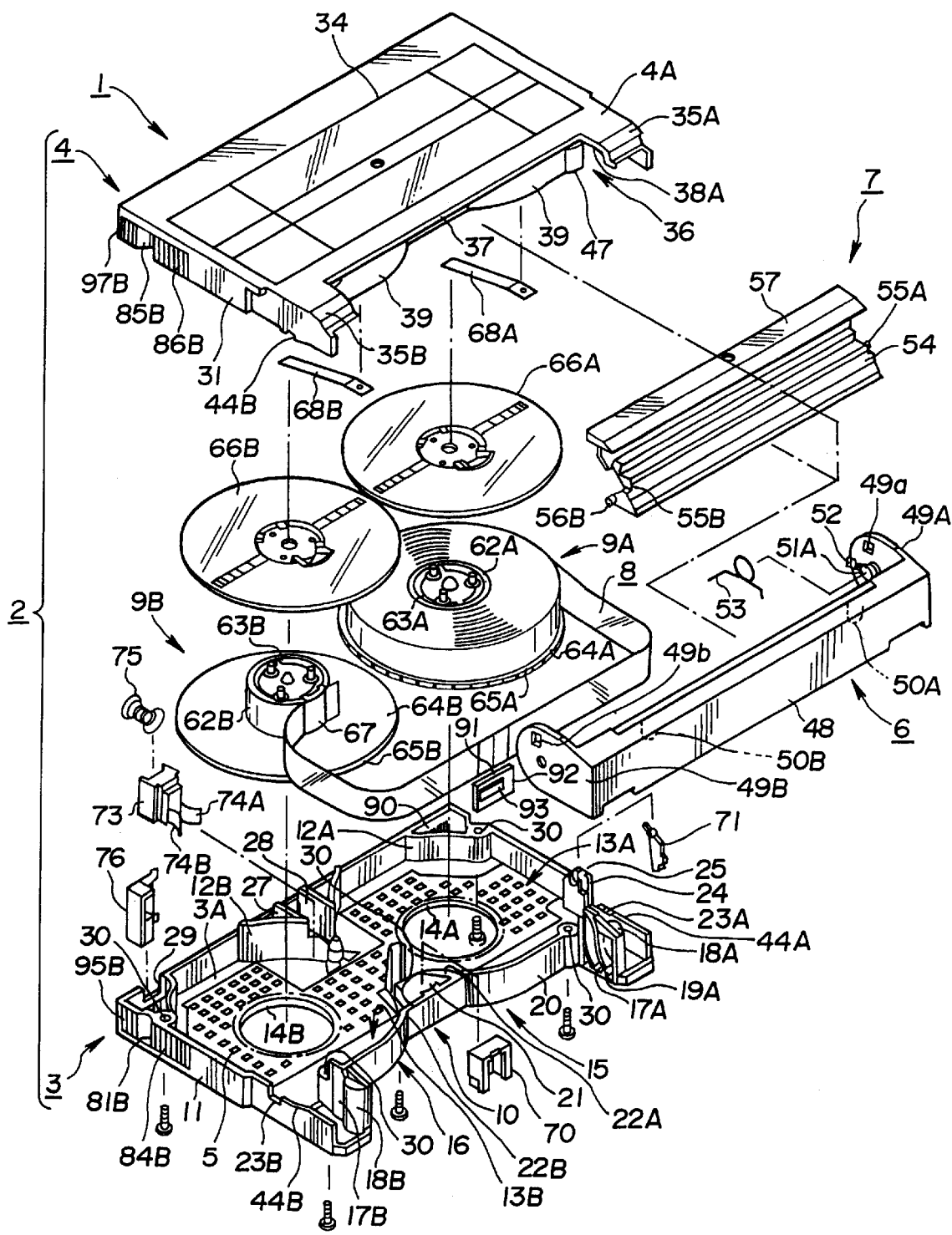
FIG. 5 is an exploded perspective view showing the tape cartridge of FIG. 4.

Although not shown in detail, the lid lock lever 71 is formed in its entirety in a wedge shape having a thickness substantially equal to the width of the lid opening guide groove 24, as shown in FIG. 5. Each of the reel lock levers 71 has a shaft-like fulcrum at its upper end and has a cam integrally formed at the front lateral surface thereof. The lid lock lever 71 is pivotally supported by the lower cartridge half 3 with the fulcrum point engaged with the lid lock lever mounting portion 25 and with the lower end thereof facing the lid opening guide groove 24.

In the substantially triangular spacing defined between the outer peripheral rib 20 and the rear-side tape reel housing sections 13A, 13B of the lower cartridge half 3 is mounted a reel lock mounting portion 27, as shown in FIG. 6. The reel lock mounting portion 27 is made up of a pair of guide wall sections set upright on the bottom surface 3A parallel to each other in the fore-and-aft direction. The reel lock mechanism, as later explained, is mounted in this reel lock mounting portion 27. Between guide wall sections of the reel lock mounting portion 27 is formed an unlock guide groove 28 into which is intruded reel unlock member provided on the recording/reproducing apparatus 101 driving the reel lock mechanism.

The reel lock mechanism is made up of a reel lock member 73, a pair of reel lock levers 74 (74A, 74B) and a lock spring 75, as shown in FIG. 5. The reel lock member 73 is assembled for sliding between guide wall sections of the reel lock mounting portions 27 and has an engagement recess in the bottom wall section thereof facing the reel unlock guide groove 28. The reel lock member 73 is biased towards the front side under the spring force of the lock spring 75 interposed between the reel lock member and the upstanding peripheral wall section 11.

The reel lock lever 74 is resilient and has its end rotatably mounted on the front side of the reel lock member 73 via a hinge. The distal end of each reel lock member 73 is formed as one with an engagement pawl and is biased in the left-and-right direction.

With the reel lock member 73 moved forwards under the force of the lock spring 75, the engagement pawl of the reel lock lever 74 of the reel lock mechanism is engaged with outer peripheral teeth 65 (65A, 65B) of the lower flange 64 of the tape reel 9, as later explained, under the spring force of the lock lever spring 75. Thus, under an ordinary condition, the reel lock mechanism holds the tape reel 9A in the locked state in the clockwise direction, while holding the opposite side tape reel 9B in the locked state in the counterclockwise direction.

With the tape cartridge 1 loaded on the recording/reproducing apparatus 101, the reel lock mechanism is driven by the reel unlock member on the recording/reproducing apparatus 101 intruded into the unlock guide groove 28. The reel lock member 73 of the reel lock mechanism is moved towards rear by the reel unlock member against the spring force of the lock spring 75 for unlocking the tape reel 9 so far locked by the reel lock lever 74.

Figure 7:
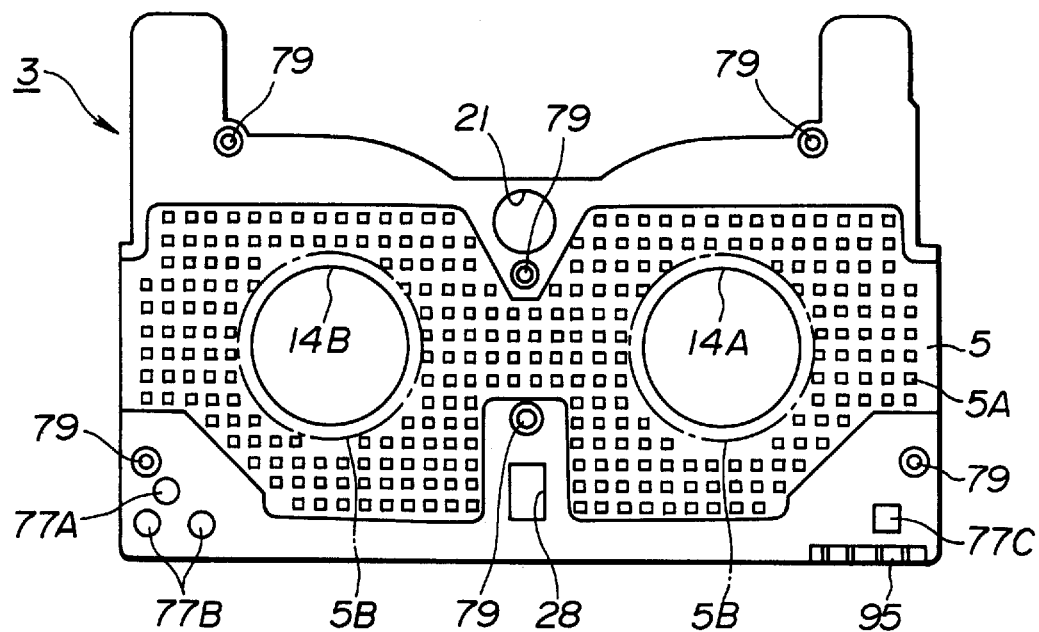
FIG. 7 is a bottom view showing a lower cartridge half of the tape cartridge shown in FIG. 4.

The lower cartridge half 3 is formed with a tape design statement discrimination holes 77 (77A, 77B, 77C), a mistaken erasure inhibiting hole 78 and a positioning hole 79, as shown in FIG. 7. The tape design statement discrimination holes 77 permit discrimination of tape design statement of the magnetic tape 8 housed within the main cartridge body portion 2, such as signal format or recording density. The mistaken erasure inhibiting hole 78 permits discrimination of the allowability of erasure of the recorded contents by visual check or by a design statement discrimination mechanism provided on the recording/reproducing apparatus 101. The positioning hole 79 is engaged by a positioning member provided on the recording/reproducing apparatus 101 for positively loading the tape cartridge 1 in position.

The lower cartridge half 3 is provided on a right rear corner thereof with a wiring substrate mounting portion 90 in the inner periphery of which is formed an insertion groove. The wiring substrate mounting portion 90 is fitted with a subsidiary memory device 91, as shown in FIG. 5.

The subsidiary memory device 91 is made up at least of a wiring substrate 92, a memory IC 93 mounted on the wiring substrate 92, and plural contact terminals 94, as input/output terminals for the memory IC 93, printed on the wiring substrate 92, as shown in FIG. 5. In the memory IC 93 is stored the identification information such as contents of information signals recorded on the magnetic tape 2 or the design statements or state of use of the magnetic tape. The contact terminal 94 is exposed to outside via a contact terminal aperture 90A formed in the wiring substrate mounting portion 90, as shown in FIG. 8.

The identification information recorded on the memory IC 93 of the subsidiary memory device 91 is read by the subsidiary recording/reproducing apparatus 101 or a separate subsidiary recording/reproducing apparatus and updated so as to be recorded on the memory IC 93.

Figure 8:
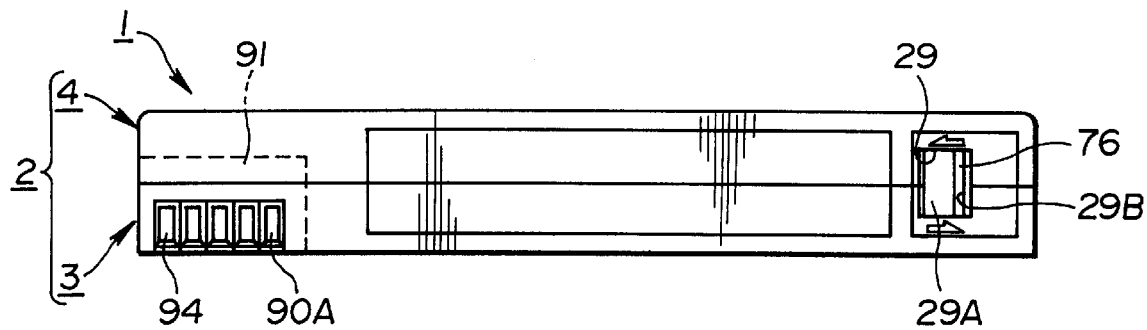
FIG. 8 is a back side view showing the tape cartridge shown in FIG. 4.

The lower cartridge half 3 is formed at a rear left corner with a mistaken erasure inhibiting member mounting aperture 29, as shown in FIG. 8. In this mistaken erasure inhibiting member mounting aperture 29 is movably mounted a mistaken erasure inhibiting member 76. This mistaken erasure inhibiting member 76 is movable between a first position 29A of opening the mistaken erasure detection hole formed in the lower cartridge half 5 and a second position 29B of closing the detection hole.

If, with the mistaken erasure inhibiting member 76 set in the first position 29A of opening the mistaken erasure detection hole 78, the tape cartridge 1 is loaded on the recording/reproducing apparatus 101, the mistaken erasure detection mechanism on the recording/reproducing apparatus 101 detects the detection hole 78 for inhibiting recording of the information signals on the magnetic tape 8. This prevents inadvertent erasure of the information signals recorded on the magnetic tape 8.

If, with the mistaken erasure inhibiting member 76 set in the second position 29B of closing the mistaken erasure detection hole 78, the tape cartridge 1 is loaded on the recording/reproducing apparatus 101, the mistaken erasure detection hole 78 is not detected by the mistaken erasure detection mechanism, thus permitting the information signals to be recorded on the magnetic tape 8.

Figure 9:
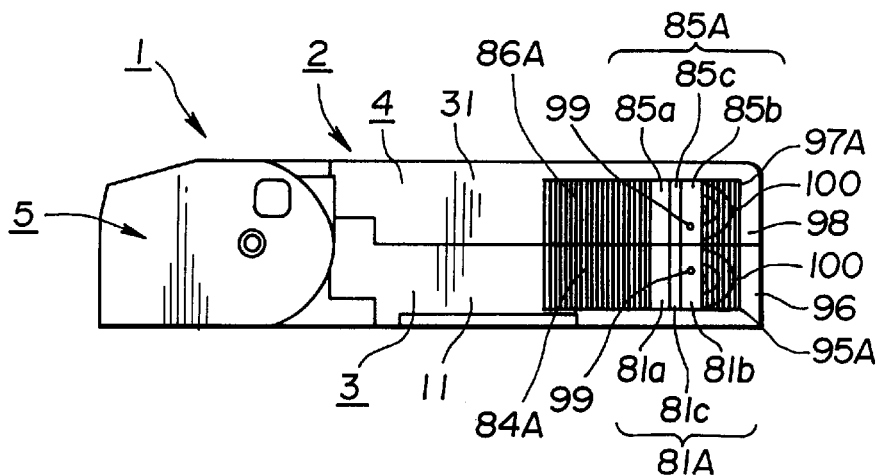
FIG. 9 is a right side view showing the tape cartridge shown in FIG. 4.
Figure 10:
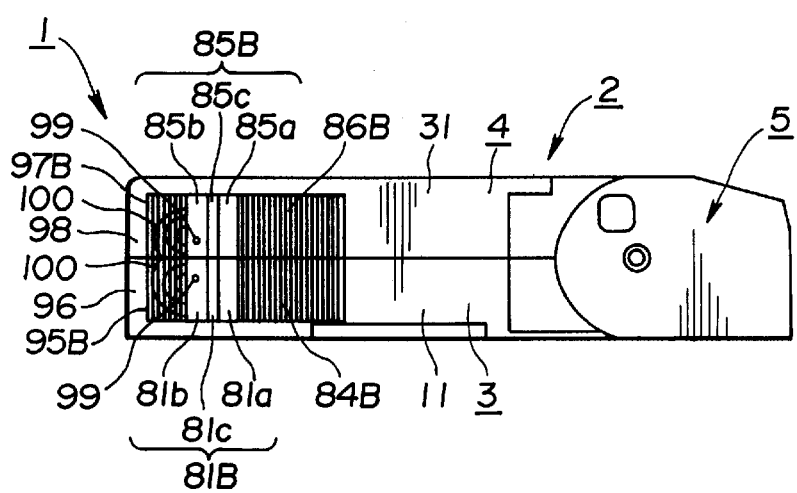
FIG. 10 is a left side view showing the tape cartridge shown in FIG. 4.
Figure 11:
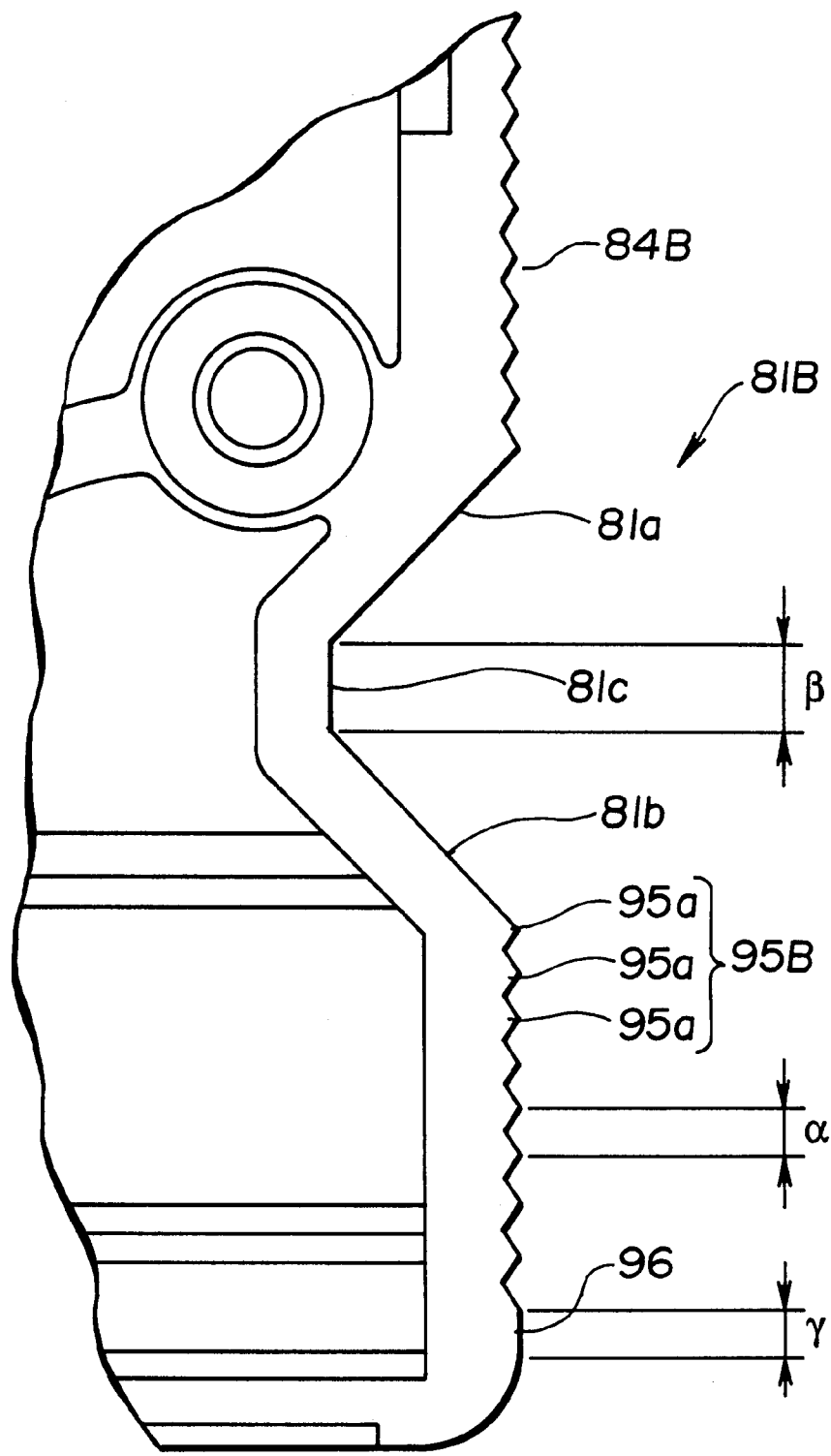
FIG. 11 is an enlarged plan view showing an arm-engagement recess and an arm-pullout irregular surface section of the lower cartridge half.

In the outer peripheral wall section 11 in the vicinity of the tape design statement discrimination hole 77A in the lower cartridge half 11 are formed a pair of arm engagement recesses 81 (81A, 81B) engaged by a pair of arms 103 (103A, 103B) of the changer device 102, as shown in FIGS. 9 and 10. Each one of a pair of arm engagement recesses 81 is formed with a substantially recessed engagement groove beginning at the proximal end of the outer peripheral wall section 11 and terminating at the distal end thereof. Also, each one of the arm engagement recesses 81 is formed with a forward inclined surface 81a and a rear inclined surface 81b so that the inner size of a bottom section 81c of the groove is narrower than the inner size of the opening end, as shown in FIG. 11. On the rear inclined surface 81b is left a gate mark 99 at a position in which a gate used for forming the lower cartridge half 3 by casting a synthetic resin material has been removed.

When loaded on the changer device 102, the tape cartridge 1 is loaded on or ejected from the recording/reproducing apparatus 101 by the pair of arms 103 of the changer device 102 engaged in the arm engagement recesses 81.

The lower cartridge half 3 is provided with a pair of arm extraction irregular surface sections 95 (95A, 95B) at back of the arm engagement recesses 81 formed in both lateral sides of the lower cartridge half 3, as shown in FIGS. 9 and 10. The arm extraction irregular surface sections 95 (95A, 95B) are each comprised of a protrusion 95a having sharply pointed distal ends, as shown in FIG. 11.

The longitudinal size a between these protrusions 95a is set so as to be smaller than the longitudinal size $\beta$ of the bottom section 81c of the groove of each one of a pair of the arm engagement recesses 81. The outer peripheral wall section of the lower cartridge half 3 is designed so that the longitudinal size $\gamma$ of a planar surface section 96 in the vicinity of the arm extraction irregular surface sections 95

(95A, 95B) is smaller than the longitudinal size β of the bottom section 81c of the groove on each one of the arm engagement recesses 81. Thus the protrusions 95a of the arm extraction irregular surface sections 95 are positively contacted by the arms 103 provided on the changer device 102.

Although flow marks 100 are formed about the gate marks 99, the protrusions 95a of the paired arm extraction irregular surface sections 95 render the flow marks 100 less apparent.

Ahead of each of the paired arm engagement recesses 81 formed on both lateral sides of the lower cartridge half 3 are formed anti-slip irregular surface sections 84 (84a, 84b), as shown in FIG. 11. These anti-slip irregular surface sections 84 are gripped by the user in inserting or ejecting the tape cartridge 1 into or out of the recording/reproducing apparatus 101.

Figure 12:
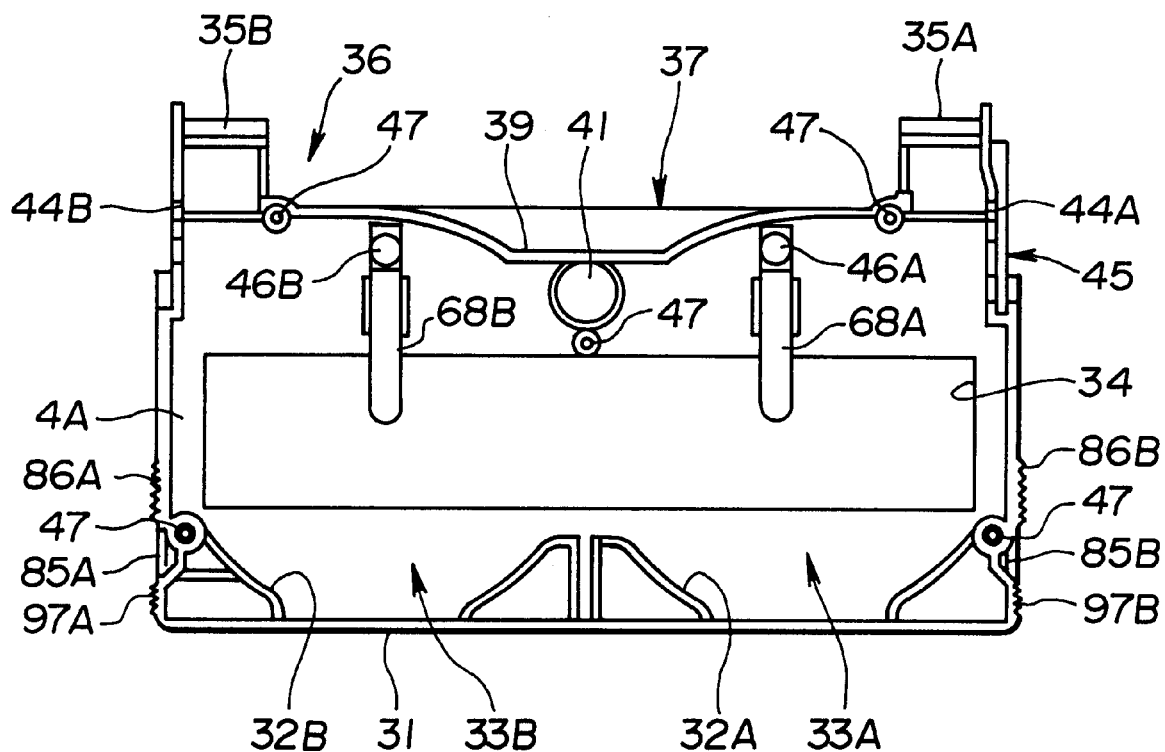
FIG. 12 is a bottom view showing an upper half of the tape cartridge.

The outer periphery of the upper cartridge half 4 excluding the front surface section 36 is formed as one with an upstanding outer peripheral wall section 31, as shown in FIG. 12. Also, the bottom surface section 4A is divided at a mid area into two portions, that is a left side portion and a right side portion. On the inner surface of the bottom surface section 4A are formed plural arcuately-shaped tape reel housing wall sections 32 (32A, 32B) making up reel housing sections 33 (33A, 33B) configured for rotatably housing the tape reels in cooperation with the tape reel housing sections 13 of the lower cartridge half 3 as described above. These wall sections 32 (32A, 32B) are set upright on the inner surface of the bottom surface section 4A so as to lie on the same circumference of a circle. In the bottom surface section 4A is formed a substantially rectangular window 34 in order to render a part of the area of the reel housing sections 33 to be seen through from outside.

At a mid portion of the opened front surface 36 of the upper cartridge half 4 is formed a substantially rectangular cut-out 37. The cut-out 37 is protruded at both front end portions 35 (35A, 35B) thereof in the shape of a visor.

An outer peripheral rib 39 is formed as one with the bottom surface 4A of the upper cartridge half 4 for constituting the inner upstanding peripheral wall section for the cut-out 37. This outer peripheral rib 39, which is of substantially the same height as the outer peripheral wall section 31, has its center portion slightly lower in height than the tape end detection light source entrance portion 21 formed on the lower cartridge half 3.

The outer peripheral rib 39 is located on the inner side of the side guide rib 17 of the lower cartridge half 3 in the assembled state of the upper cartridge half 4 to the lower cartridge half 3. Thus, when the lower cartridge half 3 is assembled to the upper cartridge half 4, both ends of the outer peripheral rib 39 are first abutted against the side guide ribs 17. In the assembled state of the upper cartridge half 4 to the lower cartridge half 3, the outer peripheral ribs 39 are positioned proximate and facing to the inner lateral edges of the side guide ribs 17.

A light source cover retainer 41 is formed as one with the outer rib 39 on the inner side of the mod portion of the rib 39 in register with the tape end detection light source entrance portion 21 on the lower cartridge half 3. In the assembled state of the upper cartridge half 4 to the lower cartridge half 3, the light source cover retainer 41 retains a light source cover 70 associated with the tape end detection light source entrance portion 21. The inner side of the light source cover retainer 41 is formed as one with a fitting tube 47. The bottom surface section 4A of the upper cartridge half 4 is formed with protuberant fitting tubes 47.

On the front sides of both lateral peripheral wall sections of the upper cartridge half 4 are formed axially aligned front lid engagement recesses 44 (44A, 44B) of U-shaped cross-section.

In the upper cartridge half 4, at back of the front lid engagement recess 44B, are formed lid lock guide recesses 45 extending in the fore-and-aft direction. In the assembled state of the upper cartridge half 4 with respect to the lower cartridge half 3, these lid lock guide recesses 45 are positioned in register with the above-mentioned lid lock lever mounting portions 25.

On the inner surface of the bottom surface section 4A of the upper cartridge half 4 are mounted reel retention spring mounting portions 46 (46A, 46B). These reel retention spring mounting portions 46 are mounted ahead of the window 34 in alignment with the centerline of the reel housing section 33. To these reel retention spring mounting portions 46 are secured reel retention springs 68 (68A, 68B) such as by heat-fusing one ends thereof. These reel retention springs 68 are abutted at the distal ends thereof against the tape reels 9 for thrusting the tape reels against the lower cartridge half 3 for prohibiting idle movement of these tape reels 9 along the height thereof in the interior of the main cartridge body portion 2.

Figure 13:
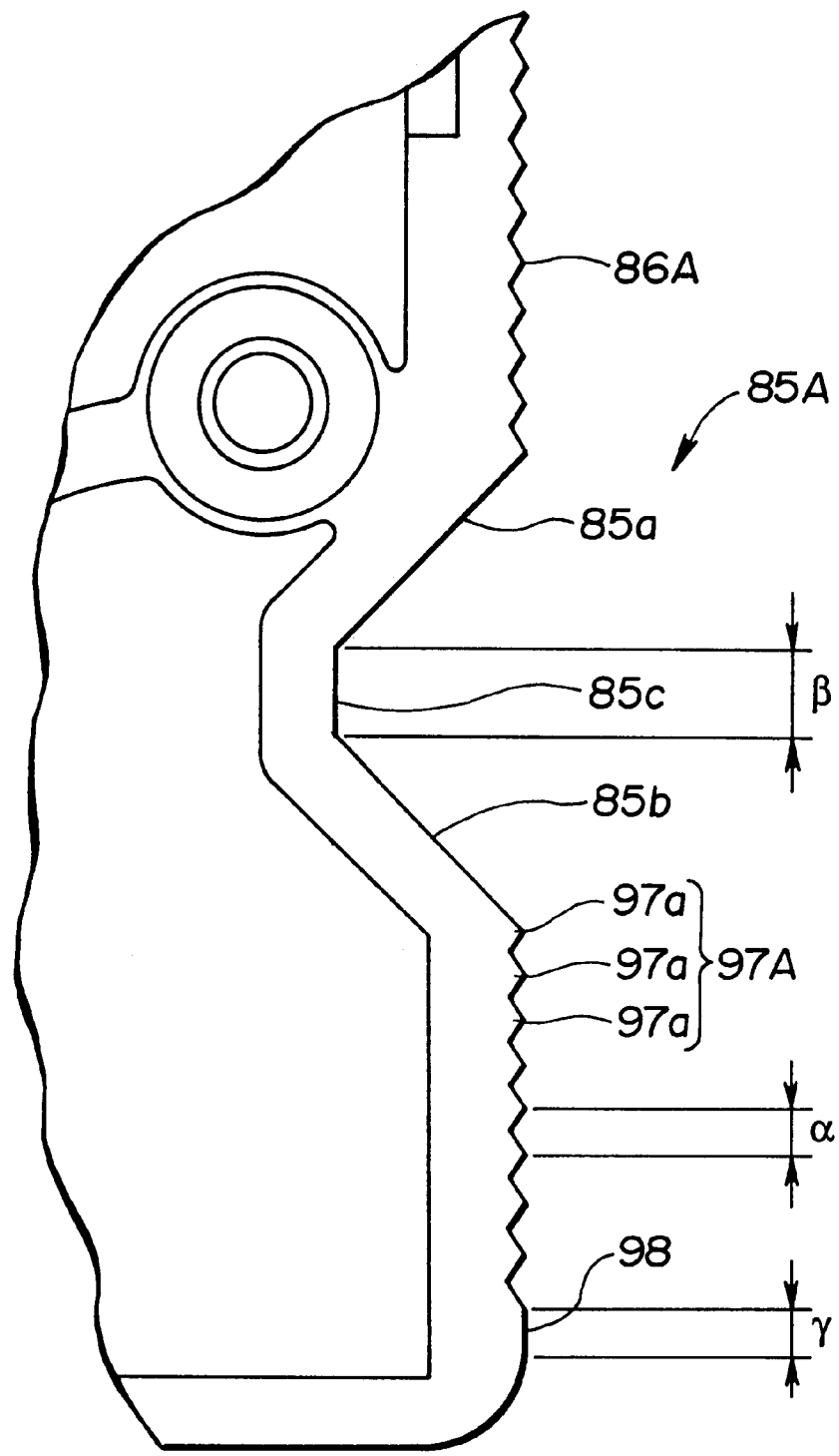
FIG. 13 is an enlarged plan view showing an arm-engagement recess and an arm-pullout irregular surface section of the upper cartridge half.
Figure 14:
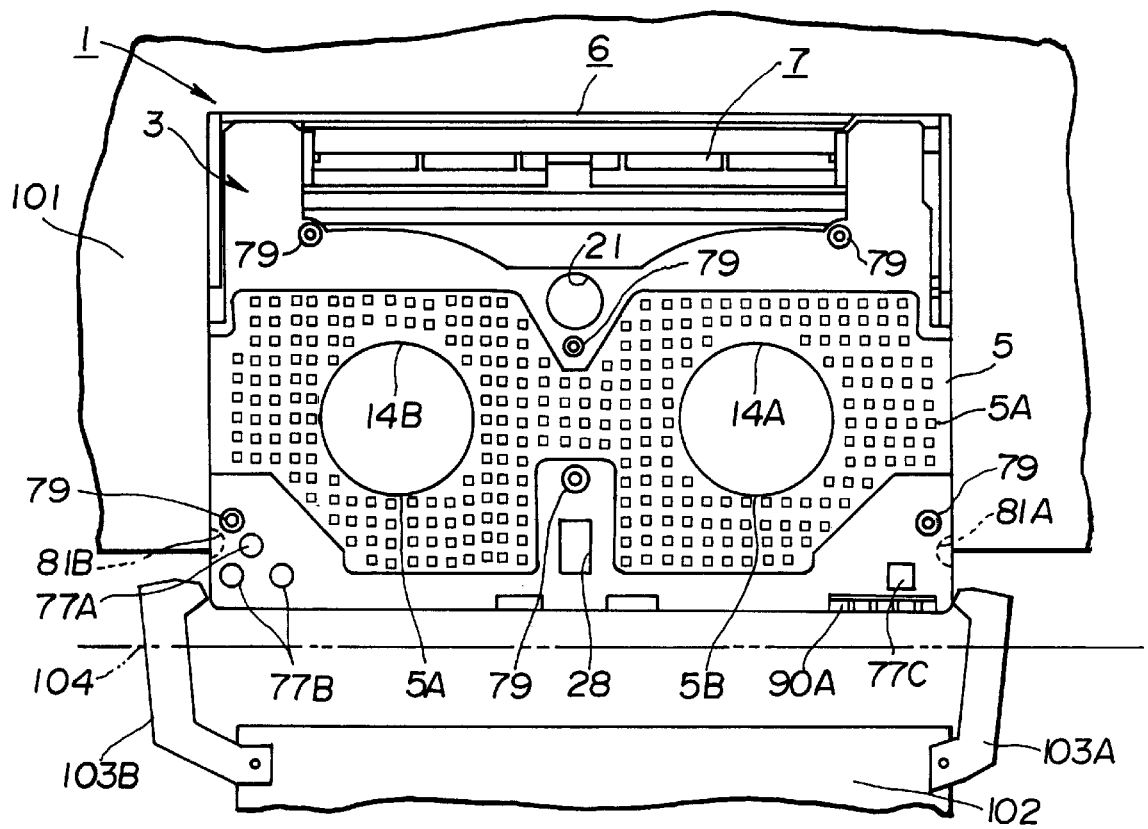
FIG. 14 is a bottom view showing the tape cartridge being pulled out by the arm of the changer device.

The upper cartridge half 4 is formed with a pair of arm engagement recesses 85 (85A, 85B), in association with the arm engagement recesses 81 in the lower cartridge half 3, so as to be engaged by the paired arms 103 of the changer device 102, as shown in FIGS. 9 and 10. Each of the paired arm engagement recesses 85 is formed with a recessed engagement groove beginning at the proximal end of the outer peripheral wall section 11 and terminating at the distal end thereof. Also, each one of a pair of arm engagement recesses 85 is formed with a forward inclined surface 85a and a rear inclined surface 85b so that the inner size of a bottom section 85c of the groove is narrower than the inner size of the opening end, as shown in FIG. 13.

On the rear inclined surface 81b is left a gate mark 99 at a position in which a gate used for forming the lower cartridge half 3 by casting a synthetic resin material has been removed. When loaded on the changer device 102, the tape cartridge 1 is loaded on or ejected from the recording/reproducing apparatus 101 by the pair of arms 103 of the changer device 102 engaged in the arm engagement recesses 81.

The lower cartridge half 3 is provided with a pair of arm extracting irregular surface sections 97 (97A, 97B) at back of the arm engagement recesses 81 formed on both lateral sides of the lower cartridge half 3, as shown in FIGS. 9 and 10. The arm extraction irregular surface sections 97 (97A, 97B) are each comprised of crests 95a having sharply pointed distal ends, as shown in FIG. 13.

The longitudinal size a between these crests 95a is set so as to be smaller than the longitudinal length β of the bottom section 85c of the groove of each arm engagement recess 85. The outer peripheral wall section of the lower cartridge half is designed so that the longitudinal size γ of a planar surface section 98 in the vicinity of the arm extraction irregular surface sections 97 (97A, 97B) is smaller than the longitudinal size β of the bottom section 85c of the groove on each one of the arm engagement recesses 85. Thus the crests of the arm extraction irregular surface sections 97 are positively contacted by the arms 103 provided on the changer device 102.

Although flow marks 100 are formed about the gate marks 99, the crests 95a of the paired arm extraction irregular surface sections 95 render the flow marks 100 less apparent.

Ahead of each of the paired arm engagement recesses 81 formed on both lateral sides of the lower cartridge half 3 are formed anti-slip irregular surface sections 86 (86a, 86b), as shown in FIG. 13. These anti-slip irregular surface sections 86 are gripped by the user in inserting or ejecting the tape cartridge 1 into or out of the recording/reproducing apparatus 101.

The upper cartridge half 4 and the lower cartridge half 3 are connected together to form the above-described main cartridge body portion 2 in the shape of a thin casing by set screws, not shown, threaded into the fitting tubes 30, 47, with the facing outer peripheral wall sections 11, 31, facing tape reel housing wall sections 12, 32, facing outer peripheral ribs 20, 30 and with the fitting tubes 30, 47 abutted and combined together, as shown in FIG. 5.

With the main cartridge body portion 2, two tape reel housing section, which are two longitudinally neighboring circular spacings, are formed, with the outer peripheral section, excluding the front section, of the main cartridge body portion 2, being closed by the outer peripheral wall sections 11, 31 and the outer peripheral ribs 20 and 39, and with the tape reel housing sections 13A, 13B of the lower cartridge half 3 cooperating with the tape reel housing sections 33A, 33B of the upper cartridge half 4, as shown in FIG. 4.

In the above-described main cartridge body portion 2, a lid structure made up of the front lid 6 and the back lid 7 is combined with the opened front side, as shown in FIG. 5. The front lid 6 is made up of a rectangular major surface section 48 of a length and a height sufficient to cover the front side of the cartridge main body portion 2 and both lateral surface sections 49 (49A, 49B) formed as one with and extending towards the rear from the major surface section 48, and is of a substantially rectangular cross-section. The inner surface of the major surface section 48 of the front lid 6 is formed as one with protuberant connecting portions 50 (50A, 50B) for establishing connection with the back lid 7 as later explained.

On the inner surfaces of the lateral surface sections 49 of the front lid 6 are formed axially aligned pivots 51 (51A, 51B). On the distal end of the inner side of the lateral surface 49A is formed as one a shaft-like cam protrusion 52. On the pivot 51B is mounted a front lid spring 53 comprised of a torsion spring.

The back lid 7 is made up of a first major surface section 54 in the form of a rectangular plate of a length and a height sufficient to stop the loading spacing 10 of the cartridge main body portion 2, and a second major surface section 57 in the form of a rectangular plate of a length and a height substantially equal to those of the front end portions 35 of the upper cartridge half 4. The back lid 7 has shaft-like fulcrum points 56 (56A, 56B) on upper edge portions of both lateral sides of the first major surface section 54, while having shaft-like cam protrusions 56 (56A, 56B) on lower edge portions of both lateral sides of the first major surface section 54. The lower portion of the first major surface section 54 of the back lid 7 is formed as a surface inclined gradually towards the front side.

The connecting portions 50 of the front lid 6 are engaged with the fulcrum points 55 of the back lid 7 for rotatably connecting the front lid 6 with the forward portion of the back lid 7, as shown in FIG. 5. The front lid 6 and the back lid 7 are connected together in this manner for forming the lid structure. When the lid structure is connected to the main cartridge body portion 2, the magnetic tape 8 is led through a spacing between the front lid 6 and the back lid 7 facing parallel to each other with a pre-set spacing in-between.

The lid structure has its back lid 7 combined with the main cartridge portion 2 by the cam protrusions 56 being engaged in the lid guide grooves 19 formed in the side guide ribs 17 of the lower cartridge half 3. The back lid 7 is located on the inner side of the front lid 6 and operates for stopping the front side of the loading spacing 10. The lid structure has the front lid 6 combined with the main cartridge body portion 2 by the pivots 51 engaged in the front lid engagement recesses 44 in the upper cartridge half 4.

When combined with the main cartridge body portion 2, the front lid 6 closes the opened front side in its entirety. The pivot 51 of the front lid 6 is retained and supported for rotation in the front lid engagement recesses 44 by both outer peripheral wall sections 11 of the lower cartridge half 3 abutted against the outer peripheral wall section 31 of the upper cartridge half 4. The front lid 6 is biased by the spring force of the front lid spring 53 loaded on the pivot 51B in a direction of closing the front side of the main cartridge body portion 2.

On the other hand, when the front lid 6 is combined with the main cartridge body portion 2, the lock cam portion 52 of the front lid 6 faces the lid opening guide groove 24 of the lower cartridge half 3. The lock cam portion 52 is engaged with the cam portion of the lid lock lever 71 for holding the front surface of the main cartridge body portion 2 in the closed state.

To both end portions of the magnetic tape 8 are connected transparent leading tapes 61, via sensing tapes, as shown in FIG. 5. The magnetic tape 8 has its both terminal leading tapes 61 connected to the tape reels 9 and wound in this state thereon. Since the tape reels on the left side and that on the right side are the same, the following description is directed to the structure of the tape reel 9A.

The tape reel 9 is made up of tubular cores 62 (62A, 62B), about the outer periphery of which the magnetic tape 8 is wound, lower flanges 64 formed as one with the outer periphery of the lower lateral surfaces of the cores 62, and clampers 67 for securing the magnetic tape 8 and upper flange members 66 connected to the cores 62. The tubular cores are formed with reel driving shaft fitting center holes 63 (63A, 63B) into which are fitted reel driving shafts provided on the recording/reproducing apparatus 101. Although not shown in detail, each core 62 has a center core and an outer peripheral core coaxially connected via plural radial ribs to the center core. The magnetic tape 8 is wound about the outer periphery of the peripheral core. Each reel driving shaft fitting center hole 63 is defined by an annular spacing delimited by the center core and the peripheral core and partitioned by radial ribs.

Each core 62 has, on an upper end face of the center core, a positioning dowel used when combining the upper flange member 66 with the core 62. The peripheral portion of the core 62 is partially removed in the axial direction for fitting the clamper 67 therein. The radial ribs are engaged with a rotation stop rib formed on the outer periphery of the reel driving shaft of the recording/reproducing apparatus 101 fitted in the reel driving shaft fitting hole 63 for unifying the tape reel 9 and the core 2 with respect to the direction of rotation.

The lower flange 64, formed as one with the core 62, is of a diameter slightly smaller than the inside diameter of the reel housing section of the main cartridge body portion 2, and is formed as one with peripheral teeth 65 on its entire periphery engaged by the reel lock lever 74 of the reel lock mechanism. The peripheral teeth 65 are formed as unidirectional ratchet teeth. The reel lock lever 74, engaged therewith, operate for locking the tape reel 9 with respect to the reel-out direction of the magnetic tape 9.

The upper flange member 66 is combined with the upper surface of the core 62 in a state in which a positioning hole formed in a mid portion of the upper flange member 66 engaged by the positioning dowel. When in the assembled state, the core 62 and the upper flange member 66 are unified together by, for example, ultrasonic welding. The upper flange member 66 is molded from, for example, a transparent synthetic resin material, in order to render the status of the magnetic tape 8 wound on the core 62 to be seen through from the window 34 formed in the upper cartridge half 4.

The tape reel 9, constructed as described above, is rotatably housed within a tape reel container section in the main cartridge body portion 2, with the reel driving shaft fitting hole 63 facing the reel opening 14 formed in the lower cartridge half 3. The reel lock mechanism limits the rotation in the reel-out direction of the magnetic tape 8. The tape reel 9 is limited by the reel retention spring 68 as described above.

The magnetic tape 8 is reeled out from the outer peripheral all section 11 of the right-side tape reel 9A so as to be engaged with the right-side tape guide 18A. The magnetic tape 8 is led along the front side of the main cartridge body portion 2 to traverse the loading spacing 10 so as to be engaged with the left side tape guide 18B and so as to be taken up from the outer peripheral wall section 11 on the left side tape reel 18B. The portion of the magnetic tape 8 traversing the loading spacing 10 is extended through a spacing between the front lid 6 and the back lid 7 for protection.

On insertion from an insertion aperture in the recording/reproducing apparatus 101, the above-described tape cartridge 1 is loaded on the loading unit of the recording/reproducing apparatus 101. When the tape cartridge 1 is loaded on the recording/reproducing apparatus 101, the reel driving shaft of the recording/reproducing apparatus 101 is intruded into the reel opening 14 of the main cartridge body portion 2 into engagement with the reel driving shaft fitting hole 63.

The lid unlock member of the recording/reproducing apparatus 101 is intruded into the lid opening guide groove 24 for driving the lid lock mechanism. The lid lock lever 71 of the lid lock mechanism is rotated by the lid unlock member for unlocking the front lid 6 of the lid structure.

With the front lid of the lid structure freed from the locked state by the lock mechanism, the lid structure is rotated, against the spring force of the front lid spring 53, by the lid driving member intruded into the lid opening guide groove 24. The front lid 6 is rotated counterclockwise in FIG. 4, about the pivot 51 as center of rotation, while driving the back lid 7 via the connecting portion 50.

The back lid 7 is moved from ahead of the lid guide grove 19, engaged by the guide cam 59, to the rear side thereof, as its fulcrum point 55 is rotatably supported by the connecting portion 50 of the front lid 6, so that the back lid 7 is slid at the same time as it is rotated slightly towards the rear of the upper cartridge half 4.

The back lid 7 is rotated from the state facing the front lid 6 to the state of being superimposed on the back lid 7. When the front lid 6 has opened the front side of the main cartridge body portion 2, tape end detection holes 49a, 49a formed in the lateral side section 49 of the front lid face the tape end detection holes 23 in the main cartridge body portion 2.

By the above-described operation of the lid structure, the closed state of the front side of the cartridge main body portion 2 by the front lid 6 and the closed state of the loading spacing 10 by the back lid 7 are changed over to respective opened states. The opened loading spacing 10 is exposed with the magnetic tape 8 located therein. The reel unlock member provided on the recording/reproducing apparatus 101 is intruded into the unlock guide groove 28 for driving the reel unlock mechanism. The reel unlock member shifts the reel lock member 73 towards rear against the spring force of the loc lever spring 75. By the above-described operation of the reel lock member 73, the reel lock lever 74 is disengaged from the peripheral teeth 65 of the tape reel 9 for enabling rotation of the tape reel 9.

The loading mechanism on the recording/reproducing apparatus 101 is intruded into the opened loading spacing 10 for pulling out the magnetic tape 8 from the tape reel 9 for loading it on the recording/reproducing unit. The tape end detecting light source 69 on the recording/reproducing apparatus 101 is intruded into the tape end detection light source entrance portion 21.

By the recording, playback, fast feed or rewind operations, the reel driving shaft is driven for running the tape reels 9 of the tape cartridge 1. The tape end detecting light source 69 is fed with power by the driving operation of the magnetic tape 8 for radiating the detection light. The detection light traverses the tape running path along the outer peripheral rib 29 of the lower cartridge half 3 and the outer peripheral rib 39 of the upper cartridge half 4 so as to be led to the tape end detection holes 23 formed in the peripheral wall section 11.

If the magnetic tape 8 is present on the tape running path, the detection light is reflected by the magnetic tape 8 without being exposed via the tape end detection holes 23 to outside of the main cartridge body portion 2. Conversely, should there be present the transparent leader tape 61 in the tape running path, the detection light is transmitted through the leader tape 61 so as to be exposed via the tape end detection holes 23 to outside the main cartridge body portion 2 and so as to be detected by the tape end detection sensor provided on the recording/reproducing apparatus 101. The recording/reproducing apparatus 101 halts the reel driving shaft by an output of the tape end detection sensor to stop the feed operation for the magnetic tape 8.

When the recording, playback, fast feed or rewind operations come to an end, the reel unlock member on the recording/reproducing apparatus 101 is receded from the lid opening guide groove 24 for resetting the lid structure to an initial state. By the spring force of the front lid spring 53, the front lid 6 of the lid structure is rotated clockwise in FIG. 4, about the pivot 51 as the center of rotation, so as to be rotated back to the position of closing the front side of the main cartridge body portion 2. The front lid 6 reverts the back lid 7 via the connecting portion 50.

The back lid 7 is moved from the rear portion towards the front portion of the lid guide groove 19 engaged by the guide cam 59, so that it is slid along the upper cartridge half 4 towards the forward side at the same time as it drives the back lid 7. The back lid 7 is rotated back to the initial position of closing the loading spacing 10 from an upper portion towards a lower portion of the lid guide groove 19 of the side guide rib 17 engaged by the cam protrusion 56.

The cam portion of the lid lock lever 71 is engaged with the lock cam portion 52 of the front lid 6, reverted to the initial position by the above-described operation, for holding the lid structure in the locked state. With the front side of the main cartridge body portion 2 and the loading spacing 10 closed by the lid structure, the reel driving shaft provided on the recording/reproducing apparatus 101 is receded from the reel opening 14 so that the tape cartridge 1 is ejected out of the insertion opening in the recording/reproducing apparatus 101.

Figure 15:
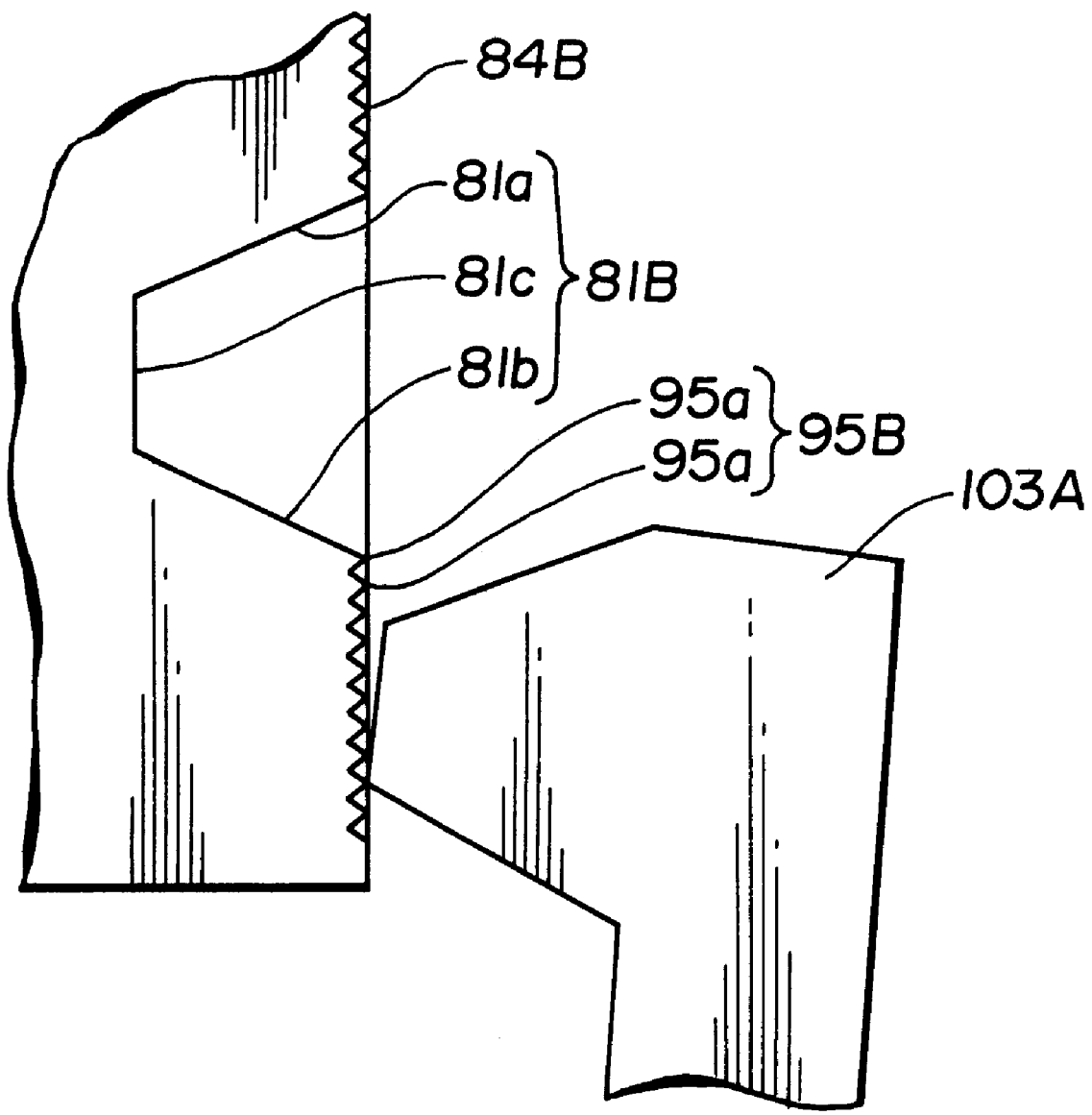
FIG. 15 is an enlarged bottom view showing the arm pullout irregular surface section gripped by the arm of the changer device.

When the tape cartridge 1 is ejected from the insertion opening in the recording/reproducing apparatus 101, paired arm extraction irregular surface sections 95, 97 are gripped by paired arms 103 of the changer device 102 so as to be taken out as far as a take-out position 104 of taking out the recording/reproducing apparatus 101. At this time, the crests 95a may be gripped positively even if the planar surface sections 96, 98 are gripped by the paired arms 103 of the changer device 102, as shown in FIG. 15.

Figure 16:
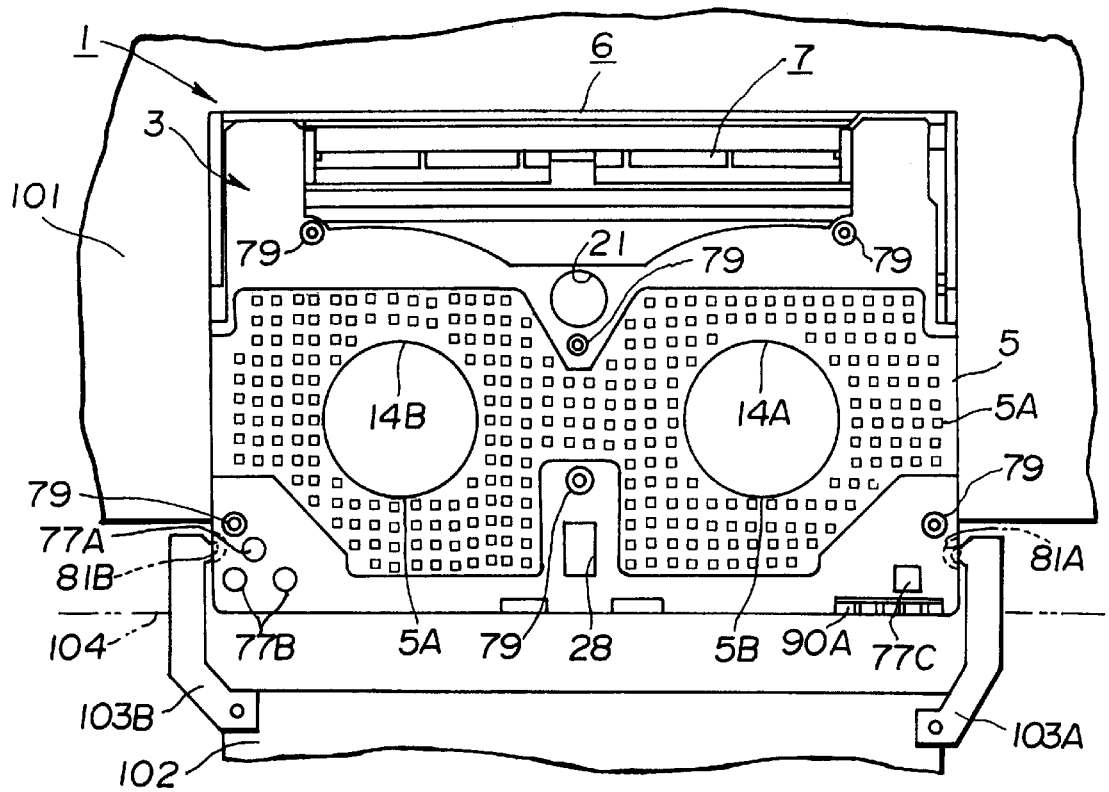
FIG. 16 is a bottom view showing the tape cartridge being taken out by the arm of the changer device.
Figure 17:
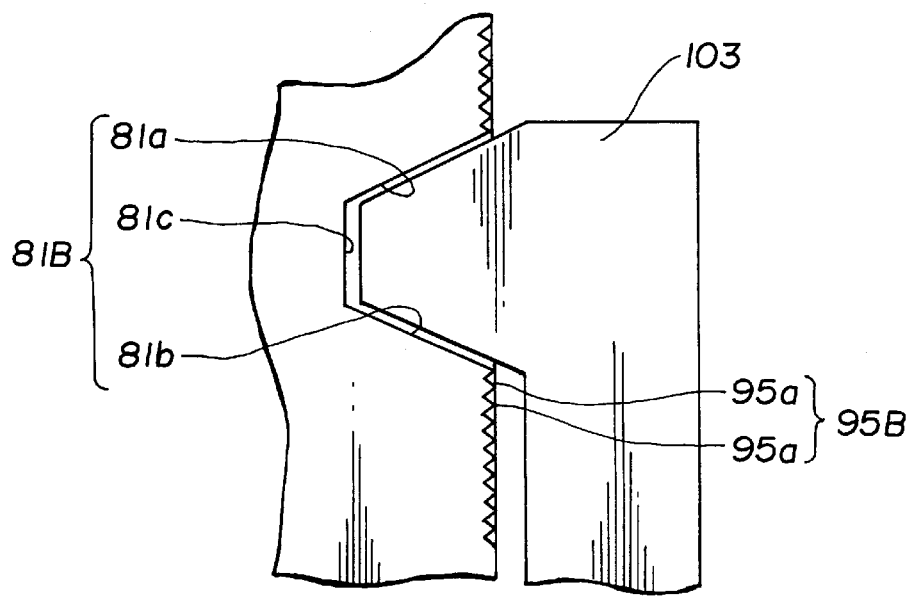
FIG. 17 is an enlarged bottom view showing the arm engagement recess engaged by the arm of the changer device.

When the tape cartridge 1 is pulled out to the position 104 of taking out the recording/reproducing apparatus 101, the tape cartridge 1 is taken out of the recording/reproducing apparatus 101 by the paired arms 103 of the changer device 102, as shown in FIG. 16. At this time, the paired arm engagement recesses 81, 85 are positively gripped by the paired arms 103 of the changer device 102, as shown in FIG. 17.

Figure 18:
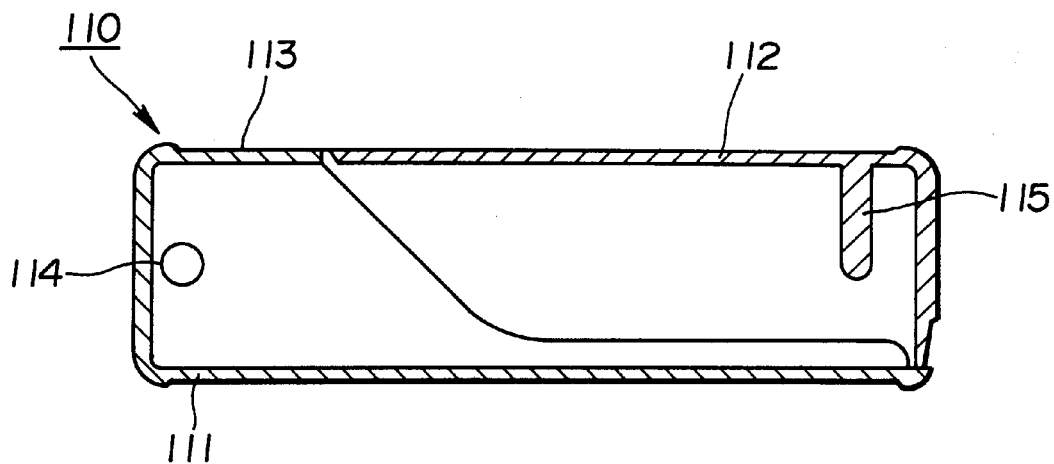
FIG. 18 is a longitudinal cross-sectional view showing a cartridge container casing containing the tape cartridge.

The tape cartridge 1 is housed within a main housing casing 110 made up of a main casing body portion 111 and a lid 112 supported for opening/closure relative to the main casing body portion 111, as shown in FIG. 18.

The casing main body portion 111 is formed of a transparent synthetic resin material. A pocket-like container 113 is formed on a lateral surface of a substantially rectangular main casing body portion 111, while shaft openings 114 are formed in alignment with each other in both lateral sides of the container 113.

The lid 112 is formed from a transparent synthetic resin material substantially as a shaped-shaped shallow saucer and has an outer wall section extending along an outer peripheral edge of the major surface, with a side of the outer wall section being opened. On the inner surfaces of both outer wall sections facing the opening of the lid 112 is protuberantly formed a dowel in axial alignment with the shaft opening in the main casing body portion 111. On the inner surfaces of both outer wall sections of the lid 112 facing the opening are formed ribs 115 for positioning the lateral sides of the tape cartridge 1. These ribs 115 are formed in register with the paired arm extraction irregular surface sections 95, 97 of the tape cartridge 1.

The lid 112 is mounted for opening/closure on the casing main body portion 111 to complete the cartridge container casing 110 by combining the lid 112 with the main casing body portion 111, with both outer lateral wall sections of the opened side of the lid 112 enlarged, and by fitting the dowel into the shaft opening 114.

Figure 19:
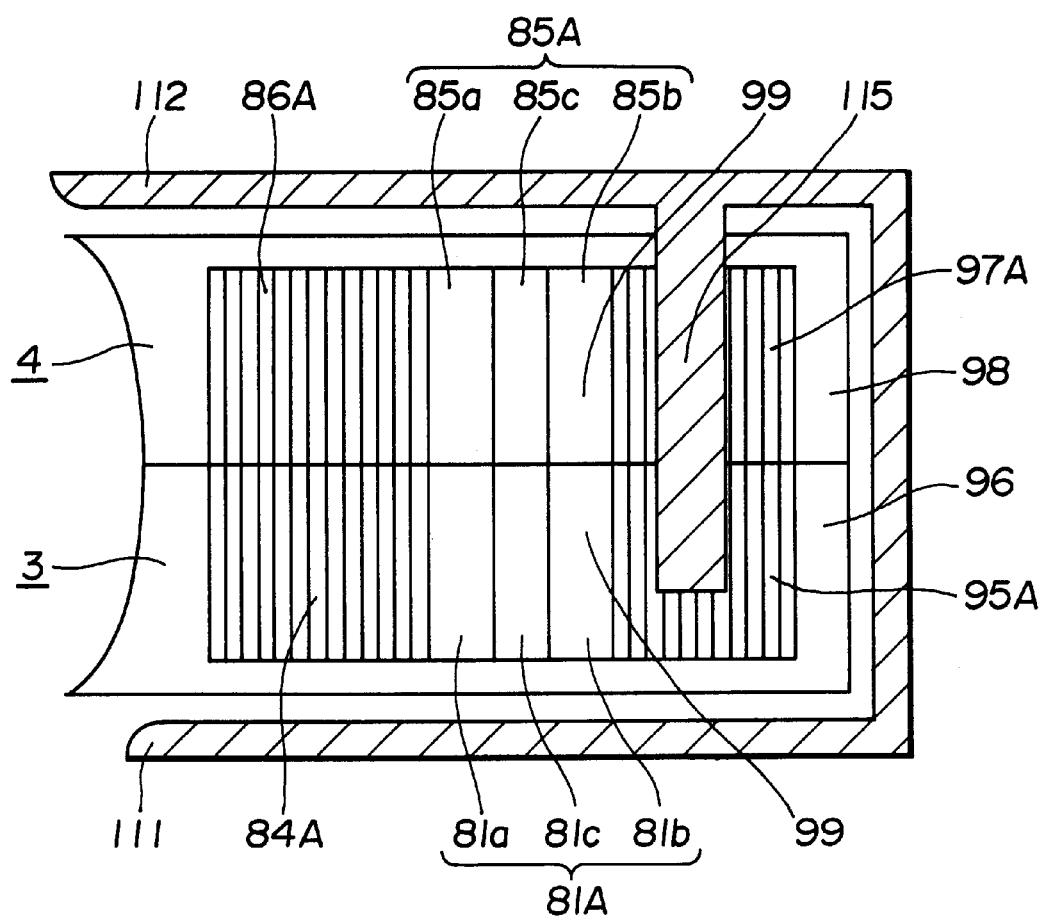
FIG. 19 is a right side view showing the tape cartridge contained in the cartridge container casing.
Figure 20:
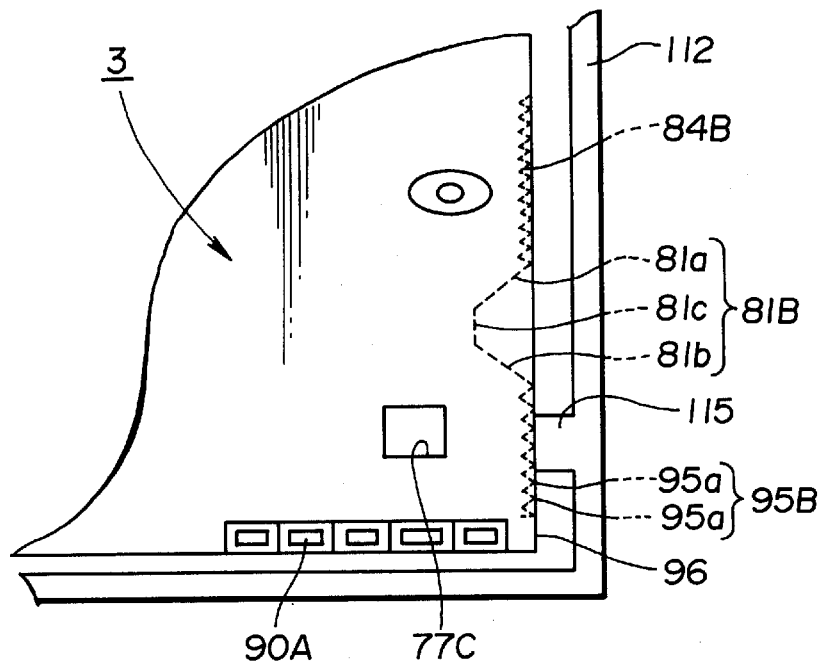
FIG. 20 is a bottom view showing the tape cartridge contained in the cartridge container casing.
Figure 21:
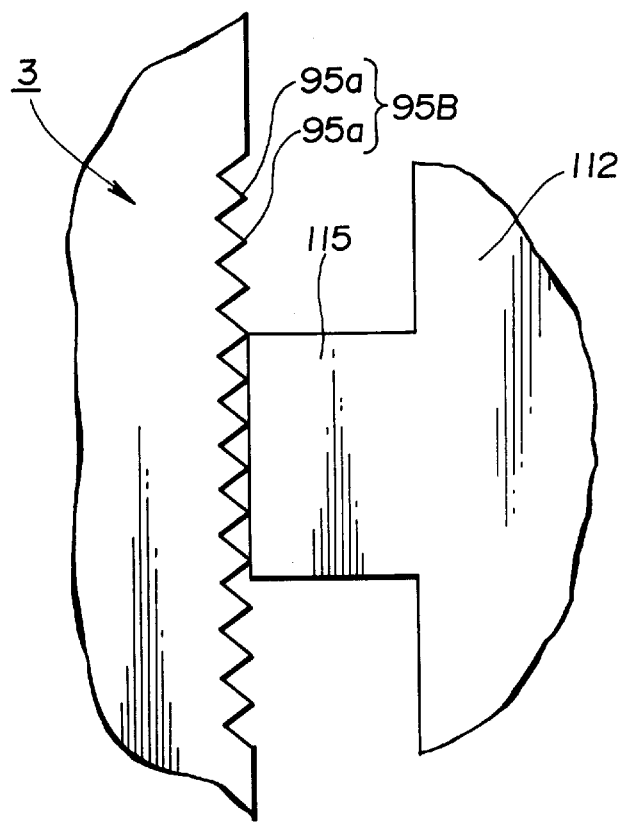
FIG. 21 is an enlarged bottom view showing the arm pullout irregular surface section having a line contact with a rib of the cartridge container casing.

The tape cartridge 1 is housed within the cartridge container casing 110 with its lateral side inserted into the housing section 113 in the casing main body portion 111 so as to be closed by the lid 112, as shown in FIG. 19. At this time, the paired arm extraction irregular surface sections 95, 97 of the tape cartridge 1 are supported by the rib 115 for preventing fluttering, as shown in FIG. 20. The paired arm extraction irregular surface sections 95, 97 are contacted at the crests 95a, 97a thereof with the rib 115 of the lid 112, as shown in FIG. 21.

With the above-described embodiment of the tape cartridge 1, the arm extraction irregular surface sections 95, 97 comprised of crests 95a and 97a having sharply pointed distal ends are provided on the outer peripheral wall sections 11, 31 of the main cartridge body portion 2, so that, when the tape cartridge 1 is pulled out of the recording/reproducing apparatus 101, the arm extraction irregular surface sections 95, 97 are gripped by the paired arms 103 on the changer device 102, thus enabling the operation of extraction of the tape cartridge out of the recording/reproducing apparatus 101 to be performed reliably by the changer device 102.

In addition, when the tape cartridge 1 is housed within the cartridge container casing 110, the arm extraction irregular surface sections 95, 97 are supported by the rib 115 formed upright on the inner surface of the cartridge container casing 110 for preventing fluttering. Since the plural crests 95a, 97a of the arm extraction irregular surface sections 95, 97 are contacted in a line contact with the rib 115, there is no risk of abrasion and resulting generation of powder debris thus protecting the magnetic tape 8.

Moreover, since the paired arm extraction irregular surface sections 95, 97 are formed in register with the flow marks formed around the gate marks 99, it becomes possible to prevent the flow marks from becoming apparent by the plural crests 95a, 97a.

The present invention is applicable to a tape cartridge in which the back lid 7 is split into two portions which are connected to each other and operated under control by a lid guide groove 19 formed in the side guide rib 17, in addition to the tape cartridge of the illustrated embodiment in which the lid structure is made up of the front lid 6 and the back lid 7.

The present invention is also applicable to a tape cartridge devoid of a lid structure or to a tape cartridge housing magnetic tapes of various tape widths, such as 8 mm or ¼ inch tapes, in addition to the tape cartridge 1 configured for data recording.

What is claimed is:

1. A tape cartridge comprising:

a cartridge main body portion having an upstanding outer peripheral wall section formed integrally therewith;

a pair of tape reels rotatably mounted on the inside of the cartridge main body portion;

a main tape reeled out from one of said tape reels so as to be taken up on the other tape reel;

arm engagement recesses, engaged by a pair of arms provided on a changer device when said tape cartridge is inserted into or ejected from a recording/reproducing apparatus, formed in the outer peripheral wall section of the cartridge main body portion; and means for positively gripping said tape cartridge for preventing the tape cartridge from escaping from the grip of said pair of arms during a positioning step prior to ejection, or after insertion, of said tape cartridge using said changer device, having a plurality of crests having sharply pointed distal ends.

2. The tape cartridge as claimed in claim 1 wherein a distance between said distal ends of said crests is selected to be smaller than a width of a bottom of a flat groove of the arm engagement recesses.

3. The tape cartridge as claimed in claim 1 wherein the outer peripheral wall section of the cartridge main body portion is designed so that a width of a planar surface section in the vicinity of the crests is selected to be smaller than a width of a bottom of a flat groove of the arm engagement recess.

4. The tape cartridge as claimed in claim 1, wherein said means for preventing said tape cartridge from escaping from the grip of said pair of arms are located on a side of said arm engagement recesses opposite that of a cassette lid.

5. A tape cartridge comprising:

a cartridge main body portion having an upstanding outer peripheral wall section formed integrally therewith;

arm engagement recesses, formed in the outer peripheral wall section of the cartridge main body portion, and engaged by a pair of arms provided on a changer device when said tape cartridge is inserted into or ejected from a recording/reproducing apparatus; and means for reducing debris production due to a rib of a cartridge container casing being in register with said outer peripheral wall section of the main cartridge body, having a plurality of crests having sharply pointed distal ends.

6. The tape cartridge as claimed in claim 5 wherein a distance between said distal ends of said crests is smaller than a width of a bottom of a flat groove of the arm engagement recesses.

7. The tape cartridge as claimed in claim 5 wherein the outer peripheral wall section of the cartridge main body portion is designed so that a width of a planar surface section in the vicinity of the crests is selected to be smaller than a width of a bottom of a flat groove of the arm engagement recess.

8. The tape cartridge as claimed in claim 5, wherein said means for reducing debris production are located on a side of said arm engagement recesses opposite that of a cassette lid.

* * * * *